United States Patent
Berninger et al.

(10) Patent No.: US 6,288,512 B1
(45) Date of Patent: Sep. 11, 2001

(54) ROBOT WITH CABLES EXTENDING AT LEAST PARTIALLY ON AN OUTSIDE

(75) Inventors: Alwin Berninger, Augsburg; Georg Hartmann, Aichach, both of (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 09/292,616

(22) Filed: Apr. 15, 1999

(30) Foreign Application Priority Data

Apr. 7, 1998 (DE) .............................. 198 17 605

(51) Int. Cl.$^7$ .............................. B25J 11/00; B25J 3/00; H02G 11/00
(52) U.S. Cl. .............................. 318/568.1; 318/568.11; 318/568.12; 414/730; 414/680; 414/918; 191/12 R
(58) Field of Search .............................. 318/560–696; 414/4, 6, 744.5, 918, 730; 901/46, 15, 50; 15/1; 285/305, 403, 903; 403/322, 328, 342; 191/12 R; 439/13; 74/490.02, 490.03; 174/72 A

(56) References Cited

U.S. PATENT DOCUMENTS

| | | | |
|---|---|---|---|
| H65 | * | 5/1986 | Beni et al. .............................. 414/730 |
| 2,142,654 | * | 1/1939 | Posner . |
| 2,571,832 | * | 10/1951 | Chapin . |
| 4,378,959 | * | 4/1983 | Susnjara .............................. 414/732 |
| 4,659,279 | * | 4/1987 | Akeel et al. .............................. 414/680 |
| 4,668,146 | * | 5/1987 | Ageta .............................. 414/4 |
| 4,695,027 | * | 9/1987 | Lindholm et al. .............................. 248/325 |
| 4,873,511 | * | 10/1989 | Tanaka .............................. 340/677 |
| 4,910,823 | * | 3/1990 | Silverman et al. .............................. 15/1 |
| 4,987,332 | * | 1/1991 | Yamamoto et al. .............................. 310/309 |
| 5,132,601 | * | 7/1992 | Ohtani .............................. 318/568.1 |
| 5,205,701 | * | 4/1993 | Kigami et al. .............................. 414/744.5 |
| 5,240,092 | * | 8/1993 | Eachus .............................. 191/12 R |
| 5,437,207 | * | 8/1995 | Zimmer .............................. 74/490.02 |
| 5,551,545 | * | 9/1996 | Gelfman .............................. 191/12.2 A |
| 5,556,370 | * | 9/1996 | Maynard .............................. 600/151 |
| 5,777,267 | * | 7/1998 | Szydel .............................. 174/72 A |
| 5,848,556 | * | 12/1998 | Ryu et al. .............................. 74/490.02 |

FOREIGN PATENT DOCUMENTS

| | | |
|---|---|---|
| 91 03 497 | 6/1991 | (DE) . |
| 94 06 405 | 8/1995 | (DE) . |
| 7-156093 | 6/1995 | (JP) . |

\* cited by examiner

*Primary Examiner*—Paul Ip
(74) *Attorney, Agent, or Firm*—Paul Vincent

(57) ABSTRACT

A robot has a plurality of components which can pivot relative to each other, in particular robot arms. Changes in separation between individual points of the robot thereby occur. This must be taken into consideration when guiding the operation cables for robot elements and in particular robot tools. The cables must be capable of accommodating length changes while being loaded to as little extent as possible during motion of the robot so that they have high durability and are not prematurely damaged. In accordance with the invention, a robot having cables extending at least partially on the outside, in particular operation cables for robot tools such as a welding tool, has cables guided in a substantially circular loop at the height of a robot arm which can pivot about an axis of the robot.

11 Claims, 1 Drawing Sheet

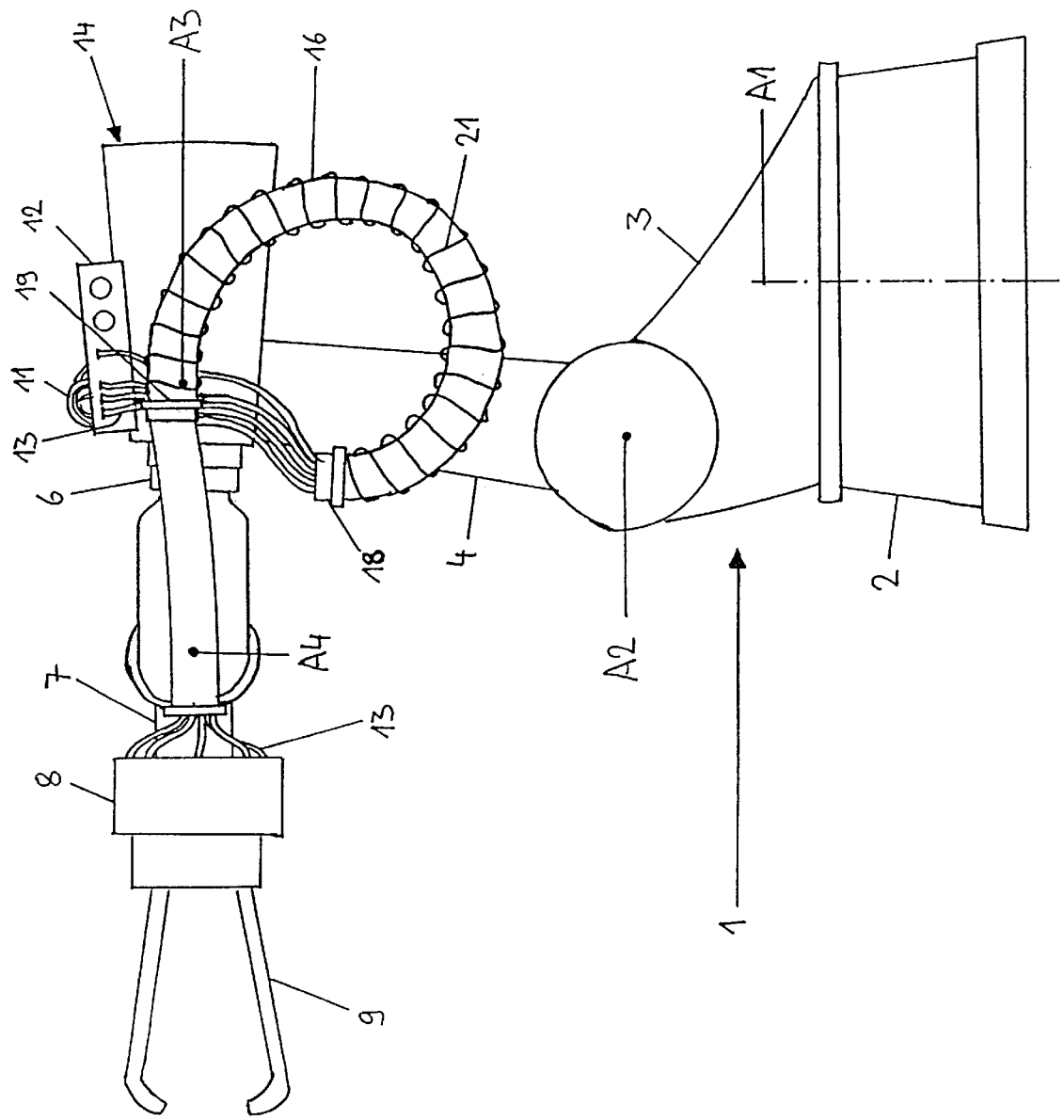

ROBOT WITH CABLES EXTENDING AT LEAST PARTIALLY ON AN OUTSIDE

This application claims Paris Convention priority of DE 198 17 605.8 filed Apr. 17, 1998 the complete disclosure of which is hereby incorporated by reference.

BACKGROUND OF THE INVENTION

The invention concerns a robot with cables extending at least partially on the outside, in particular operation cables for robot tools such as a welding tool.

A robot has a plurality of components which can pivot relative to each other, in particular robot arms. Changes in the separation between individual points of the robot thereby occur. This must be taken into consideration when guiding the operation cables for robot elements, in particular robot tools. They must be able to accommodate changes in length while being loaded to as little an extent as possible during motion of the robot so that they have high durability and are not prematurely damaged.

It is therefore the underlying purpose of the invention to further improve a robot of this kind to effect an improved guiding of the cable which does not load the cable itself while having a large amount of reserve length and thereby good length compensation.

SUMMARY OF THE INVENTION

The above mentioned purpose is achieved in accordance with the invention in a robot of the above mentioned kind in that the cables are substantially guided in a circular shaped loop at the height of a robot arm which can pivot about an axis of the robot.

A preferred embodiment provides that a cable separation location is disposed on that robot arm which can pivot about an axis of the robot, with the cables extending therefrom being guided in a substantially circular-shaped fashion. This improvement avoids the need to exchange the entire cables extending from the base of the robot to the elements supplied by a cable, such as motors or a robot tool, when an exchange is necessary, e.g. when the robot tool is exchanged. Rather it is completely sufficient to only exchange that portion of the cable between the cable separation location and the tool or the other elements whose operation cables are separated via the cable separation location.

A further improved configuration provides that the circular-shaped cable loop extends through more then 270°. The cable is preferentially guided in a circular fashion through a circumference angle of at least 300°.

An improvement provides that the cables are guided in a protected tube, with the cables being guided in collars at the beginning and at the end of the circular cable guide. The circular-shaped loop is thereby reliably maintained as a reserve length. In order to prevent the cables from drooping in the region between the second forward guiding collar and their supply end, e.g. at the tool, a further preferred embodiment provides that the cables are surrounded, in their circular-shaped loop region, by a helical spring under compression, with the helical spring preferentially abutting on the collar.

The invention facilitates an economical energy supply, in particular to tools, while requiring little space, wherein components subject to wear are separated so that in the event of wear a separate exchange is possible.

Additional advantages and features of the invention can be extracted from the claims and from the subsequent description in which a preferred embodiment of a robot configured in accordance with the invention is described in detail.

BRIEF DESCRIPTION OF THE DRAWING

The sole FIGURE shows a robot configured in accordance with the invention in side view.

DESCRIPTION OF THE PREFERRED EMBODIMENT

The robot 1 configured in accordance with the invention has a base 2 having a carrousel 3 seated thereon for pivoting about a first (vertical) axis A1 of the robot. A first robot arm 4 is hinged on the carrousel for pivoting about a second, horizontal axis A2, the first robot arm 4 bearing an additional robot arm 6 which can pivot about a second horizontal axis A3. The robot arm 6 bears a robot hand 7, likewise for pivoting, about an axis A4, which has a tool 8 which, in this case, is a welding tool having a welding tong 9.

Cables 11 are guided from the base 2 to, as viewed by the observer of the FIGURE, the opposite side of the robot in an upward direction to the arm 6; the cables 11 are visible in the FIGURE from their end point above the robot arm 6. A cable separation location 12 is disposed on the robot arm 6 which can be configured as a terminal box or the like.

Operation cables 13 extend from the cable separation location 12 to the tool 8. The operation cables 13 are not directly guided along a shortest path to the tool 8, rather travel in a circular-shaped loop initially in a downward direction and then towards the backward end 14 of the robot arm 6 opposite the tool 8, in an upward direction, and then below the cable separation location 12 towards the front to the tool 8. The cables 13 are thereby guided in a circular manner through an angle in excess of 300°. The cables 13 are guided, in particular in the region of their circular extension, within a flexible guiding tube 16. The guiding tube 16 is supported at its front entrance end for the cables 13 by means of a collar 18 and on the end of the circular-shaped guiding region by means of a collar 19, each borne on arm 6. The collars 18 can, as shown in the FIGURE, also float. The cables are surrounded by a helical spring between the collar 18 and the collar 19 which is tensioned between the collars 18, 19 to urge the path of the cables in the circular-shaped region to extend its length so that the cable length between the tool and the collar 19 is minimized in each case and the cable does not droop in a disruptive manner in this region.

We claim:

1. A robot comprising:
   a robot arm borne for pivoting about a robot axis; cables and
   cables guided means at an outside of the robot in one single substantially circular loop at a height of said robot arm, said circular loop lying in a plane extending substantially perpendicular to said robot axis, said circular loop extending in an initially downward direction and curving towards a rear portion of said robot arm to proceed in an upward direction and loop towards a front portion of said robot arm.

2. The robot of claim 1, wherein said cables comprise operation cables for robot tools.

3. The robot of claim 2, wherein said robot tools comprise a welding tool.

4. The robot of claim 1, wherein said robot axis extends in a substantially horizontal direction.

5. The robot of claim 1, further comprising a cable separation location disposed on said robot arm, wherein said cables extending from said separation location are guided in a substantially circular-shaped fashion.

6. The robot of claim 1, wherein said the circular loop extends through at least 270°.

7. The robot of claim 6, wherein said circular loop extends through at least 300°.

8. The robot of claim 1, further comprising a protective tube, wherein said cables are guided within said protective tube.

9. The robot of claim 1, further comprising a first collar disposed at a first end of said circular loop and a second collar disposed at a second end of said circular loop.

10. The robot of claim 1, further comprising a helical spring under compression, wherein said helical spring surrounds said cables at said circular loop.

11. The robot of claim 10, further comprising a first collar disposed at a first end of said circular loop and a second collar disposed at a second end of said circular loop, wherein a first end of said helical spring abuts at said first collar and a second end of said helical spring abuts at said second collar.

* * * * *

UNITED STATES PATENT AND TRADEMARK OFFICE
CERTIFICATE OF CORRECTION

PATENT NO. : 6,288,512 B1
DATED : September 11, 2001
INVENTOR(S) : Berninger, Alwin et al.

It is certified that error appears in the above-identified patent and that said Letters Patent is hereby corrected as shown below:

<u>Title page,</u>
Item [30], please change the date of the Foreign Priority Application Data as follows
-- Apr. 17, 1998 --.

<u>Column 2,</u>
Lines 49-59, please replace claim 1 as follows
-- 1. A robot comprising:

a robot arm borne for pivoting about a robot axis; and cables guided at an outside of the robot in one single substantially circular loop at a height of said robot arm, said circular loop lying in a plane extending substantially perpendicular to said robot axis, said circular loop extending in an initially downward direction and curving towards a rear portion of said robot arm to proceed in an upward direction and loop towards a front portion of said robot arm. --

Signed and Sealed this

Twenty-sixth Day of November, 2002

Attest:

JAMES E. ROGAN
*Attesting Officer*   *Director of the United States Patent and Trademark Office*